Sept. 8, 1970   D. J. FOSTER   3,526,992
FLORAL SUPPORTS
Filed Aug. 8, 1967   2 Sheets-Sheet 1
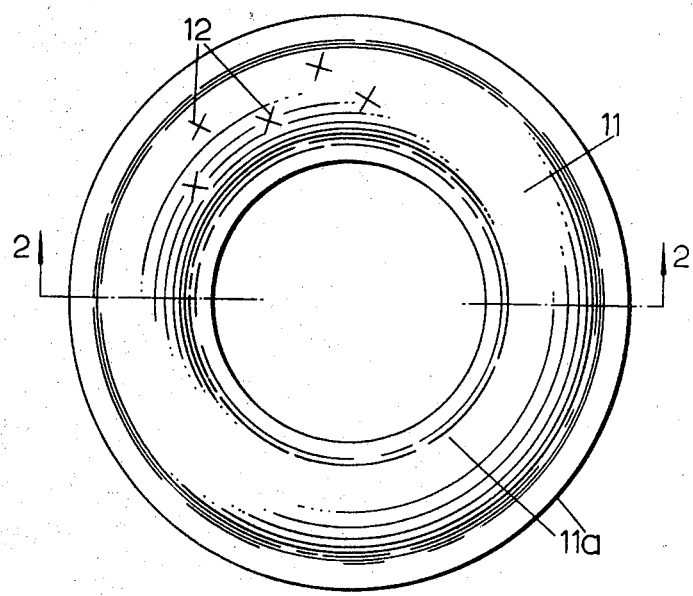
–FIG.1–
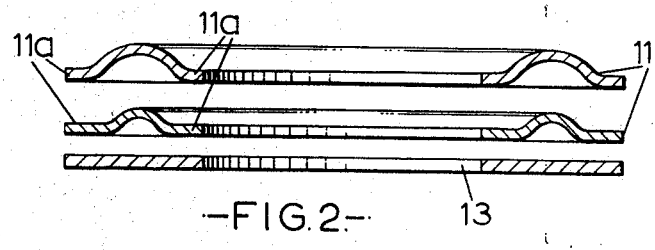
–FIG.2–
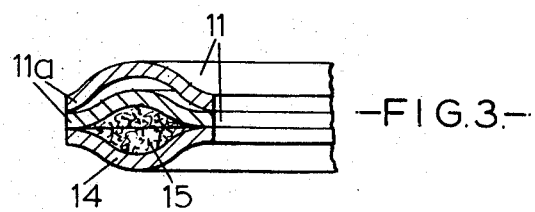
–FIG.3–

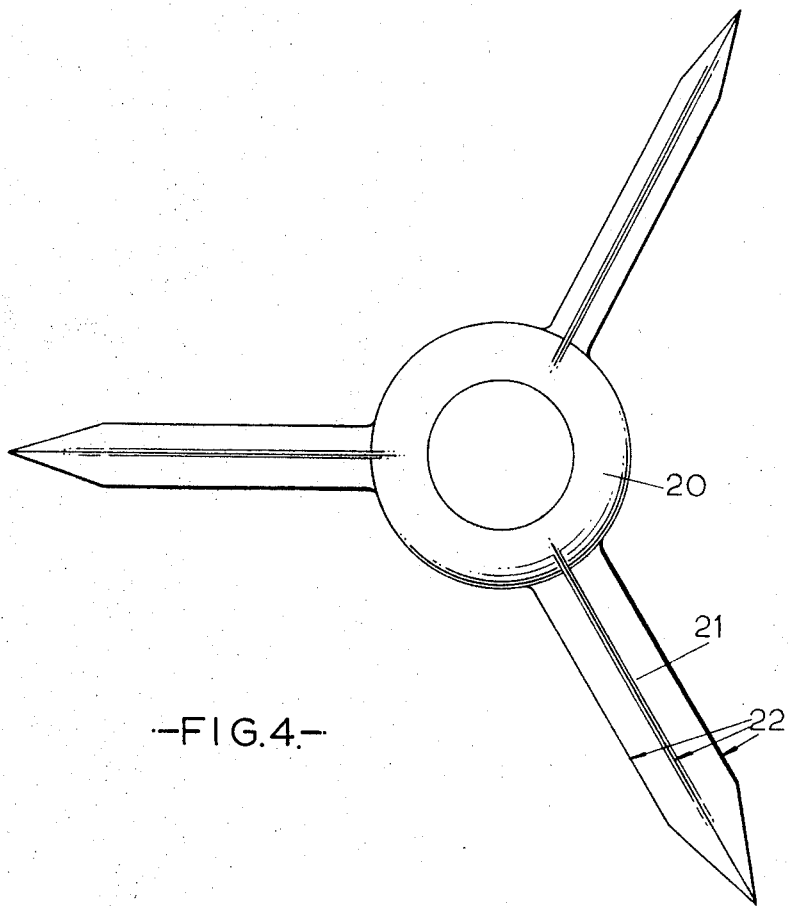
-FIG.4.-

United States Patent Office 3,526,992
Patented Sept. 8, 1970

3,526,992
FLORAL SUPPORTS
David Joseph Foster, 45 Kiln Lane,
St. Helens, Lancashire, England
Filed Aug. 8, 1967, Ser. No. 659,150
Claims priority, application Great Britain, Aug. 12, 1966,
36,158/66
Int. Cl. A47g 7/07; A01g 5/04
U.S. Cl. 47—41.11                                    3 Claims

ABSTRACT OF THE DISCLOSURE

Floral support comprising at least two spaced apart support layers adapted to receive and retain stem portions of flora by the provision of aligned apertures in the support layers; and a piercing tool for forming said apertures comprising a plurality of vanes extending laterally of an arm and tapering to a common end region directed longitudinally of said arm.

---

The present invention concerns a support for floral arrangements or displays and a piercing tool for use therewith.

Floral arrangements such as, for example, wreaths are presently prepared by binding the flora together with wire until the desired shape of the floral arrangement is achieved. However, a wreath or other floral arrangement formed in such a manner, although adequately supported by the wire binding, is laborious, time consuming and hence costly to prepare. It is therefore an object of the present invention to provide a support which facilitates a quicker and more convenient preparation of floral or similar arrangements without detracting from the appearance of the completed arrangement or display.

According to the present invention a floral support comprises at least two spaced apart support layers adapted to receive and retain stem portions of flora by the provision of aligned apertures in the support layers.

In one embodiment of a support in accordance with the invention the spaced apart support layers are of expanded polystyrene which may, for example, be vacuum moulded into any desired shape. The support layers are generally arcuate in section and are each surrounded by an outwardly extending flange or rim, by means of which the layers are fastened together. Preferably these layers are backed by a channel-section base layer of a plastics material so as to form a compartment with an adjacent support layer which may be filled with foam plastic granules or other moisture-retaining material, to which water may be added to keep the flora fresh for as long as possible. Alternatively, the support layers may be simply backed by a cardboard base layer. The layers may be fastened together by stapling, stitching, adhesion or by the application of heat.

After the layers have been fastened together holes are made where required in the moulded support layers to receive and retain the end portions or stems of the flora. These holes are preferably made with a tool in accordance with a further feature of the invention having, e.g. four barbs or the like vanes extending laterally of an arm and tapering to a common end region directed longitudinally of the arm. Such a tool makes a hole substantially in the shape of a cross. This arrangement adequately supports and retains the flora since the end portions or stems pass through at least two layers for lateral support and are retained by the barbed holes which tend to close about the stems if they are pulled outwardly. The stems pass through the support layers into the watered compartment formed by the base layer and its adjacent support layer.

The support may be generally annular so that when greenery is inserted in the apertured layers a wreath is provided which has the appearance of a conventional wreath produced by intertwining and wiring, but with a considerable saving in time and expertise. Novel shapes and effects may also be provided for example heart, kidney or cross shapes and nacelles or the like protuberances may be formed as for supporting outstanding sprays of flowers, in the support layers in which holes are subsequently provided.

In an embodiment for supporting cut flowers the generally annular or substantially annular backing layer is in the form of a dish for receiving water; the dish is of plastics or may be made of card or papier mâché preferably with a water resistant intercoating, and is provided with flanges for attachment to the supporting and retaining layers as by stapling. The dish may be round, oval or rectangular in plan or generally annular in correspondence to the plan of the supporting and retaining layers, at least in the former cases having a flattened or indented bottom so that the support assembly can stand erect with the bottom resting on a table or other surface.

The piercing tool has several vanes provided on an arm of the tool and the angle of taper is generally in the range of from 30° to 10°, usually from 25° to 15°.

The tool may comprise a plurality of sets of vanes of successively increasing width in order to make apertures and flanges of more than one size.

A plurality of arms may be provided each of which may be connected, at the end opposite to the vane end region(s), to a common boss or otherwise secured to a handle permitting of their alternate use.

The tool may be moulded, usually by injection moulding, from plastics material such as high impact polystyrene.

The invention is illustrated by way of example in the accompanying drawings, in which:

FIG. 1 is a plan view of a floral support in accordance with the invention;

FIG. 2 is an exploded section along the line 2—2 of FIG. 1;

FIG. 3 is a part section of a preferred embodiment of a floral support in accordance with the invention; and FIG. 4 shows an embodiment of a piercing tool for use with the floral support of the invention.

FIGS. 1 and 2 of the drawings show a floral support for use in preparing a wreath. The support comprises two support layers 11 of expanded polystyrene moulded to the desired shape of the floral display, in this case a wreath. The layers 11 are so formed that when fastened together at their edge regions 11a their moulded portions are in spaced relationship. Holes 12 are then made through the layers 11 for the reception of the stems of the desired flora, preferably by means of a piercing tool also forming part of this invention. The ends of the stems extending through the second or last of the support layers are concealed by a base layer which may be a simple laminar layer 13 of, for example, cardboard.

Preferably, however, the base layer has a channel section as indicated by reference numeral 14 of FIG. 3 so as to form a compartment with the adjacent support layer 11 to receive granules of foam plastic or other moisture-retaining material 15. In the case of, for example, displays of cut flowers the base layer may be in the form of a dish or bowl (not shown) for receiving a supply of water into which the stems will, of course, extend.

FIG. 4 shows an example of a piercing tool for making flanged apertures in the floral support, the tool comprising a central boss 20 from which three co-planar arms 21 extend symmetrically radially, each arm 21 being provided with four laterally extending vanes 22 at right angles to each other with the ends of the vanes 22 being tapered to a common point whereat opposite vanes subtend an angle of about 40°. The vanes on each arm 21 are of different width so as to enable a user to selectively produce apertures of a size suited to the diameter of the stem of the flora to be displayed.

In a specific example the arms 21 may each be 2 inches long emanating from a 1 inch diameter boss and have vanes of such a width as to selectively produce apertures having a diameter of 5/16 inch, 7/16 inch or 9/16 inch.

The boss 20 may be extended laterally of the arms 21 for use as a handle for accommodating the hand of the operator. Preferably, however, the boss 20 is in the form of a ring, having a finger hole of up to about an inch in diameter laterally of the arms 21 so that the tool may be carried on a finger of an operator. It has been found that, even with the arms 21 extending two inches from the centre of the hole, this allows the operator to retain the tool on a finger whilst manipulating other tools, such as scissors or a hand stapler.

In use the operator places a finger through the hole in the boss 20, places the ends of the vanes 22 of an arm 21 on the surface of the support layer 11 and pushes the vanes 22 therethrough and also through at least one spaced apart underlying support layer 11 so as to make apertures of predetermined size in each layer 11.

I claim:
1. A floral support comprising:
  (a) a pair of substantially rigid support layers, each of said support layers having a generally arcuate portion surrounded by a flanged edge portion, the arcuate portion of one support layer being positioned within and spaced from the arcuate portion of the other support layer, and the flanged edge portions of said support layers being joined together,
  (b) each of the arcuate portions of said support layers having a plurality of apertures therethrough, the apertures in one support layer being aligned with the apertures in the other supoprt layer to enable the stem portions of flora to be received and retained therein, and
  (c) a base layer disposed adjacent to the arcuate portion of said one support layer to conceal the ends of the stem portions of flora received within said apertures and to define with said last-mentioned arcuate portion a compartment for accommodating a moisture-retaining material, said base layer being joined to the flanged edge portion of said one support layer.

2. A floral support according to claim 1 wherein said base layer has a channel section opposed to the arcuate portion of said one support layer.

3. A floral support according to claim 1 wherein said support layers are of expanded polystyrene moulded to the shape of a desired floral arrangement or display.

References Cited

UNITED STATES PATENTS

| | | | |
|---|---|---|---|
| 1,611,589 | 12/1926 | Janusek | 47—41 XR |
| 1,739,462 | 12/1929 | Hunt et al. | 47—41 XR |
| 3,047,981 | 8/1962 | Shupe et al. | 47—41.12 |
| 3,310,912 | 3/1967 | Melander | 47—41.12 |
| 3,302,327 | 2/1967 | Fant | 47—41.12 |

ROBERT E. BAGWILL, Primary Examiner

U.S. Cl. X.R.

248—27.8